(12) United States Patent
Yuan et al.

(10) Patent No.: US 7,304,116 B2
(45) Date of Patent: Dec. 4, 2007

(54) BRAIDED COMB-SHAPED SALT-RESISTANT POLYMER THICKENING AGENT

(75) Inventors: Shiyi Yuan, Beijing (CN); Jianhui Luo, Beijing (CN); Ruoying Pu, Beijing (CN); Yuzhang Liu, Beijing (CN); Huaijiang Zhu, Beijing (CN); Pingmei Wang, Beijing (CN); Chunming Xiong, Beijing (CN); Ying Zhang, Beijing (CN); Fengluan Bai, Beijing (CN); Jingbo Yang, Beijing (CN)

(73) Assignee: Petrochina Company Limited, Beijing (CN)

( * ) Notice: Subject to any disclaimer, the term of this patent is extended or adjusted under 35 U.S.C. 154(b) by 46 days.

(21) Appl. No.: 11/447,035

(22) Filed: Jun. 6, 2006

(65) Prior Publication Data
US 2006/0287456 A1   Dec. 21, 2006

(30) Foreign Application Priority Data
Jun. 10, 2005   (CN) .................. 2005 1 0075291

(51) Int. Cl.
*C08F 20/06*   (2006.01)
*C08F 20/26*   (2006.01)

(52) U.S. Cl. .................. 526/264; 526/287; 526/288; 526/307.5; 526/307.6; 526/318; 526/318.2; 526/318.3; 526/318.5; 526/320

(58) Field of Classification Search ............ 526/264, 526/287, 288, 307.5, 307.6, 318, 318.2, 318.3, 526/318.5, 320
See application file for complete search history.

(56) References Cited

U.S. PATENT DOCUMENTS

| | | | |
|---|---|---|---|
| 4,304,902 A | | 12/1981 | Landoll |
| 4,814,096 A | | 3/1989 | Evani |
| 6,124,396 A | * | 9/2000 | Hahn et al. .......... 524/801 |
| 6,833,419 B2 | * | 12/2004 | Morschhauser et al. .... 526/288 |
| 6,891,011 B2 | * | 5/2005 | Morschhauser et al. .... 526/288 |

FOREIGN PATENT DOCUMENTS

CN     1414057     4/2003

\* cited by examiner

*Primary Examiner*—Helen L Pezzuto
(74) *Attorney, Agent, or Firm*—Morrison & Foerster LLP.

(57) ABSTRACT

A braided comb-shaped salt-resistant thickening agent for tertiary oil extraction from class I oil reservoir is disclosed.

The agent is polymerized with monomer (A) and monomer (B), and monomer (A) is one or multiple water soluble non-saturated compound(s) with alkenyl chain, while monomer (B) is at least one compound with the following formula:

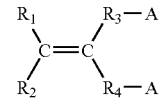

Monomer (A) is preferably acrylamide, ethenyl pyrrolidone, 2-acrylamide-2 methylpropane sulfonic acid, and acrylic acid or the mixture of the above said compounds, and in the formula of monomer (B), A is COOH, OH, $SO_3H$, $R_1$ and $R_2$ are H or $C_1$-$C_{12}$ alkyl, $R_3$ and $R_4$ represent $C_1$-$C_{12}$ alkyl, $C_1$-$C_{12}$ alkylaryl, $C_1$-$C_{12}$ alkyl ether or $C_1$-$C_{12}$ alkyl ester group. This thickening agent has fine water solubility and good property to thicken water medium. The polymer's molecules present a braided comb-shaped structure in water solution with fine salt-resistant performances. The agent can be used together with the water extracted from oil mines to compound the polymer for tertiary oil extraction, and the polymer solution's viscosity can reach the level of the comb-shaped salt-resistant polymer solution applied in class I oil reservoir, so it can promote the economic benefits of tertiary oil extraction from class II oil reservoir and expand the application scope.

9 Claims, 1 Drawing Sheet

BRAIDED COMB-SHAPED SALT-RESISTANT POLYMER THICKENING AGENT

TECHNICAL FIELD OF INVENTION

The invention relates to a fluidity controlling agent for increasing the yield of oil field, especially to a braided comb-shaped salt-resistant polymer thickening agent.

BACKGROUND OF THE INVENTION

Polyacrylamide has poor salt-resistance, and it must be combined with freshwater so as to reach economic and stable viscosity for the polymer solution. Therefore, it turns into one of the hot spots of study in the world's petroleum chemical field.

Polymer flooding, which has been used as an important part of the technologies for increasing oil fields' petroleum yield since 1950s, is to introduce polymer into water so as to increase the water viscosity and lower the water fluidity. Increased viscosity and decreased aqueous phase permeability caused by the use of certain polymers leads to decrease of the fluidity ratio, which increases the volume spread efficiency and decreases the oil saturation in the spread zone so as to promote the water-flooding efficiency.

It is well known that the polymers used for polymer-flooding oil are mainly partially hydrolyzed polyacrylamide and polysaccharide (biopolymer). However, in freshwater, the molecules of polyacrylamide are in a stretched sate with a strong tackifying ability because of electrical mutual exclusion among the sodium carboxyl groups in the molecules; while in brine, the molecules of polyacrylamide are in a curly state because the sodium carboxyl groups in the polyacrylamide molecules are electrically shielded. The higher the degree of hydrolysis (i.e. the higher the content of sodium carboxyl groups), the polyacrylamide molecules in brine are curlier, and the tackifying ability is poorer. When hydrolysis degree of polyacrylamide is equal to or greater than 40%, deposition will not occur, in spite of seriously curved polyacrylamide molecules and greatly decreased tackifying ability. In hard water (with high contents of $Ca^{2+}$ and $Mg^{2+}$), when hydrolysis degree of polyacrylamide is equal to or greater than 40%, polyacrylamide molecules combine with polyvalent ions such as calcium and magnesium, thus flocculating deposition will occur. Polymer stability is very important because of long period of tertiary oil extraction cycles. Therefore, the polymer for tertiary oil extraction must ensure the hydrolysis degree of molecules thereof is $\leq 40\%$ in over three months in oil field stratum, only so, the polymer can possess heat-resistant and salt-resistant properties in oil field applications. However, hydrolysis reaction of the amide radical of polyacrylamide is very fast in acid or alkali conditions, and it will also be accelerated quickly in neutral conditions by rising of temperature, which causes the polyacrylamide to lose its heat-resistant and salt-resistant properties in oil reservoir temperature, and it might also causes harms to the stratum due to jamming the stratum. Polysaccharide has good heat-resistance and salt-resistance, but it has the shortcomings of high cost, poor feeding properties, and being easy to be biodegraded.

A lot of research work has been done in order to overcome the aforementioned shortcomings. U.S. Pat. No. 4,304,902 discloses an ethylene oxide polymer with long-chain epoxide, but this method needs high concentration of the said polymer (about 1%) for thickening, and it also demands surfactant to assist dissolution. U.S. Pat. No. 4,814,096 discloses that the copolymer of acrylamide, acrylic acid and dodecyl methacrylate (i.e., a hydrophobic associated polymer) have good heat-resistance, salt-resistance and anti-shearing properties. The disadvantage of this method lies in that the dodecyl methacrylate is water-insoluble. A large quantity of surfactants must be introduced in for copolymerization, which on the one hand leads to high cost for the copolymer, and on the other hand is difficult to provide a polymer of high molecular weight, so that its capability for thickening aqueous medium is poor and the applications are limited with dramatically increased application cost.

With extensive literature study, we classify the researches on heat-resistant and salt-resistant polymers both at home and abroad into amphoteric polymers, monomeric heat-resistant and salt-resistant polymers, hydrophobic associated polymers, complex polymers, blending polymers and comb-shaped polymers. But the amphoteric polymers have poor solubility due to internally complex structure of anion and cation radicals in the molecules. As the aging time increases, the hydrolysis degree of amphoteric polymers containing acrylamide increases, the positive-charge and negative-charge radicals on the molecule chains become unequal, the molecule chains become curlier and curlier as the mineralization develops, and the solution viscosity highly drops and salt-resistance disappears gradually. Besides, cations of the amphoteric polymers can lead to highly increased adsorption amount of polymers in the stratum, and the polymers are massively adsorbed in regions near the oil wells so as to seriously affect the tertiary oil extraction efficiency adversely and increase the tertiary oil extraction cost. Monomeric heat-resistant and salt-resistant polymers truly have long term heat-resistance and salt-resistance, but it costs too much to manufacture the polymers with the currently available production conditions (synthesis of raw materials, synthesis method and production techniques), so they can be used only in some special cases, and no one can afford it economically to apply the polymers in large scale of tertiary oil extraction. Hydrophobic associated polymers produce intra- and inter-molecular association, and according to analysis to probability and molecule's formation stability, the intra-molecular association should be superior to the inter-molecular association. Therefore, the hydrophobic associated polymer solution is very poor in stability. The viscosity of the polymer solution will drop rapidly with extension of test time, and there even exist the separation of association (i.e., deposition). And similarly, the hydrophobic associated polymers are poor in water solubility, but with high filtration factor. They appear in the form of glue products and it is hard to turn them in a economic way into a water-soluble powder product to meet the requirement of oil well's tertiary oil extraction (it can promote the polymers' solubility to add large quantity of surfactant before drying, but the hydrophobic association properties of the polymers will be seriously affected adversely and the production cost will increase). Rising of temperature can promote hydrophobicity of the hydrophobic radicals and enhance the hydrophobic association properties, but at the same time it accelerates the speed of intra-molecular association, thus the stability of the solution becomes poor. In addition, the sequential distribution of hydrophobic monomeric units along the main polymer molecular chains is also an important parameter with respect to the solution's viscosity. The products of non-homogeneous polymerization and homogeneous polymerization are of random structures, that is to say, it is hard to control the product quality of the hydrophobic associated polymers (micelle polymerization process can help settle the issue, but it will increase the production cost abundantly). The short wire-drawing behavior (poor in flexibility) of the hydrophobic associated polymers degrades the elastic oil flooding effects (which are equivalent to viscosity oil flooding effects), therefore, the polymers' ability of oil flooding is affected adversely. Hydrophobic associated polymers have relatively low molecular weights, so association only occurs in high concentration rather than in low concentration, and in such an occasion, the solution viscosity is much lower than that of conventional polyacrylamide. That is to say, hydrophobic associated polymers cannot resist the dilution of stratum water. However, large quantity of water exists in tertiary oil extraction stratum. Electrolyte with small molecules can enhance the solvent's polarity so as to enhance the hydrophobic association. This will leads to intensifying the polymer's intra-molecular association in condition of high degree of mineralization. That is to say, variation of mineralization degree can influence the hydrophobic associated polymers greatly, and hydrophobic associated polymers cannot resist high salt content. The complex polymers based on combinations of aforementioned principles have better properties than single of the foregoing polymers, and the application scopes thereof are expanded further. However, they still cannot overcome the defects of aforementioned polymers on principle, so they cannot meet the requirements for tertiary oil extraction in oil field.

A Chinese patent application with invention No. 01136798.9 has been disclosed for a comb-shaped salt-resistant thickening agent (a comb-shaped polymer) in the past, and the thickening agent has been extensively used in oil reservoir of class I. It is formulated with sewage directly and its thickening ability is 50% greater than that of polyacrylamide. The oil condensing and water decreasing effects thereof are very remarkable, and it has become a new oil flooding agent for tertiary oil extraction for class I oil reservoir (with good penetrability). However, the molecular weight of the industrial products of these comb-shaped polymers is greater than that of polyacrylamide, and its dissolving rate is slower than that of polyacrylamide, so it will encounter some troubles in injection properties when it is used for class II oil reservoirs (of which the penetrability is poorer than that of class I oil reservoir). Tertiary oil extraction from class II oil reservoirs is becoming an emphasis for oil fields. The penetrability of class II oil reservoirs is lower than that of class I oil reservoir, so it is necessary to utilize a new salt-resistant polymer that has lower molecular weight, good salt-resistance, and a dissolving rate the same as that of polyacrylamide.

SUMMARY OF THE INVENTION

Water content in the oil fields in China is generally greater than 88.8% by mass, and tertiary oil extraction technology (the third extraction) is one of the major means taken by the old oil fields for lowering the water content and raising the crude oil recovery yield. In 2002, tertiary oil extraction output took up 11.7% by mass of the annual oil output of China Petroleum Corporation and 22.6% of the annual oil output of Daqing Oil Field of the same year, and the newly increased recoverable reserves from tertiary oil extraction of Daqing Oil Field took up 46% of its total annually increased oil reserves in the year. Tertiary oil extraction has been serving as an important role for Daqing Oil Filed and sustainable development of Chinese oil industry in the twenty-first century. The polymer mainly used in tertiary oil extraction was polyacrylamide in the past. However, polyacrylamide has poor salt-resistant performances, and it must be combined with freshwater so as to reach an economic viscosity and viscosity of the polymer solution being comparatively stable as well. On the one hand, a great amount of freshwater is consumed in the oil fields for polymer oil flooding, on the other hand, the large amount of water extracted from the oil wells is wasted because the water's mineralization degree is so high that the solution formulated with the water is of low viscosity, is unstable and an economic viscosity cannot be obtained therefrom. Nearly all of Chinese oil fields locate in the areas where freshwater is in severe shortage, and environmental protection becomes more and more important in China, therefore, disposal of large quantity of sewage extracted from oil wells becomes a big trouble that must be settled. Therefore, sewage should be used for compounding the polymers for tertiary oil extraction. The present invention of the comb-shaped salt-resistant polymer has been used in some oil fields for tertiary oil extraction in class I oil reservoir areas with great success achieved. However, the class I oil reservoirs have been extracted or are being extracted with tertiary extraction technology, meanwhile, class II oil reservoirs possess about the same reserves as class I oil reservoirs, so class II oil reservoirs will be the next main potential reservoirs for the oil fields to raise their yield. Penetrability of class II oil reservoirs is lower than that of class I oil reservoirs; therefore, the molecular weight of the polymer used for tertiary oil extraction from class II oil reservoirs must be lower than that of the polymer for tertiary oil extraction from class I oil reservoir. The purpose of this invention is to settle the salt-resistant issue of the polymer with relatively low molecular weight, and provide a copolymer thickening agent that has lower molecular weight than the comb-shaped salt-resistant polymer, fine water solubility, strong ability to thicken water medium, and fine salt-resistant properties, with the polymer's molecules presenting a braided comb-shaped structure in aqueous solution.

The present invention provides a braided comb-shaped polymer thickening agent that is copolymerized by monomer (A) and monomer (B), and the said monomer (A) is one or more water soluble unsaturated compound(s) with olefin chain, while monomer (B) is at least one polymer of the following formula:

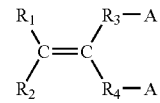

in which, monomer (A) is selected from the group consisting of acrylamide, vinyl pyrrolidone, 2-acrylamide-2-methyl propane sulfonic acid, and acrylic acid and the mixture thereof, and in the formula of monomer (B), A is COOH, OH, or $SO_3H$; $R_1$ and $R_2$ are H or $C_1$-$C_{12}$ alkyl respectively; $R_3$ and $R_4$ represent $C_1$-$C_{12}$ alkyl, $C_1$-$C_{12}$ alkylaryl, $C_1$-$C_{12}$ alkyl ether or $C_1$-$C_{12}$ alkyl ester group respectively.

Said monomer (A) is present in an amount of 70~99.99% of the total mass of monomer (A) and monomer (B).

The total monomer concentration of monomer (A) and monomer (B) in the polymer is 10~50% by mass, and preferentially 15~49% by mass.

The braided comb-shaped salt polymer thickening agent allows the use of water extracted from oil wells for formulating the polymer for tertiary oil extraction with the viscosity of the polymer reaching the level of comb-shaped salt-resistant polymer solution for class I oil reservoir, so as to promote the economic benefits of tertiary oil extraction in class II oil reservoir and broaden the application scope.

DETAILED DESCRIPTION OF THE INVENTION

Figure 1:
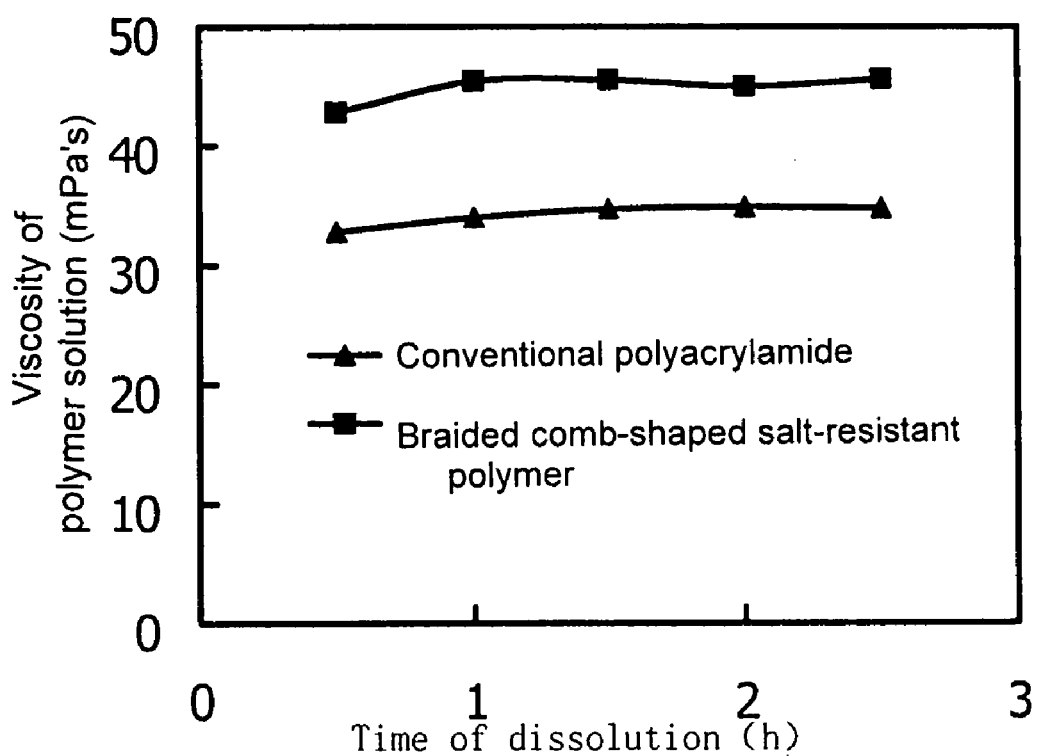
FIG. 1 shows a solubility of the braided comb-shaped salt-resistant polymer

The embodiments of the invention are specifically described exemplarily, but not limited, by the following examples in combination with the sole FIGURE.

EXAMPLE 1

In an aqueous solution of 15% by mass of acrylamide and 5% by mass of monomer (b), the specific structure for the formula of monomer (B) in this example was:

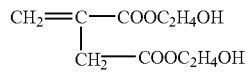

Nitrogen was fed for deoxygenation for 30 minutes, 0.2% by mass of azo-diisobutyronitrile was introduced in as initiating agent, and the obtained was kept at 60° C. for 14 hours, so as to get a viscoelastic hydrogel product. The said product was dried in kneader at 90° C. for 8 hours to get a product in solid state, which was the polymer thickening agent.

EXAMPLE 2

In an aqueous solution of 9% by mass of acrylamide, 6% by mass of acrylic acid and 8% by mass of monomer (B), the specific structure for the formula of monomer (B) in this example was:

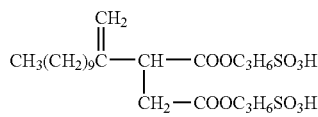

The solution was adjusted to a pH value being 8 with sodium hydroxide, nitrogen was fed for deoxygenation for 30 minutes, then 0.1% by mass of ammonium persulphate and 0.1% by mass of rongalite were introduced in, and the obtained was kept at a constant temperature of 40° C. for 8 hours to get a viscoelastic hydrogel product. The said product was granulated in granulator, then dried in a rotating drier at 90° C. for 3 hours to get a product in solid state, which was the polymer thickening agent.

EXAMPLE 3

In an aqueous solution of 5% by mass of acrylamide, 10% by mass of ethylene pyrrolidone and 5% by mass of monomer (b), the specific structure for the formula of monomer (B) in this example was:

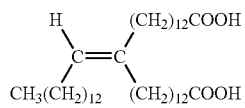

Nitrogen was fed for deoxygenation for 30 minutes, 0.15% by mass of azo-diisobutyronnitrile was added in as initiating agent, and the obtained was kept at a constant temperature of 60° C. for 14 hours to get a viscoelastic hydrogel matter as the target product.

EXAMPLE 4

In an aqueous solution of 5% by mass of acrylamide, 10% by mass of 2-acrylamide-2-methyl propane sulfonic acid and 6% by mass of monomer (B), the specific structure for the formula of monomer (B) in this example was:

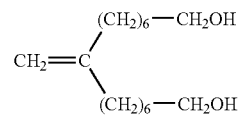

The solution was adjusted to a pH value of 9, nitrogen was fed for deoxygenation for 30 minutes, then 0.1% by mass of ammonium persulphate and 0.1% by mass of sodium bisulphite were added in and the obtained was kept at a constant temperature of 60° C. for 6 hours to get a viscoelastic hydrogel product as the target product.

EXAMPLE 5

In an aqueous solution of 15% by mass of acrylamide, 20% by mass of 2-acrylamide-2-methyl propane sulfonic acid and 5% by mass of monomer (b), the specific structure for the formula of monomer (B) in this example was:

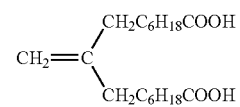

The solution was adjusted to a pH value of 9, nitrogen was fed for deoxygenation for 30 minutes, then 0.1% by mass of ammonium persulphate and 0.1% by mass of sodium bisulphite were introduced in and the obtained was kept at a constant temperature of 60° C. for 6 hours to get a viscoelastic hydrogel product as the target product.

EXAMPLE 6

The solid product obtained from Example 1 and conventional polyacrylamide were tested in same conditions for property comparison. The tested results in FIG. 1 and Table 1 showed that the molecular weight of the braided comb-shaped salt-resistant polymer was much lower than that of conventional polyacrylamide or comb-shaped salt-resistant polymer industrial products. But its viscosity, either applied in freshwater or sewage in Daqing Oil Field, or in sewage in Dagang Oil Field, is higher than those of the conventional polyacrylamide and comb-shaped salt-resistant industrial products, especially in Dagang Oil Field, it is 41.2% higher than that of conventional polyacrylamide. The dissolving rate of the braided comb-shaped salt-resistant polymer is substantially comparative to that of conventional polyacrylamide, wherein the time for dissolution is about 2 hours. It demonstrated that the braided comb-shaped salt-resistant polymer had lower molecular weight, relatively higher dissolving rate and better salt-resistance, and was applicable in tertiary oil extraction from oil reservoir of class II.

TABLE 1

Basic Performances of the Braided Comb-Shaped Salt-Resistant Polymer

|  |  | Industrial product of comb-shaped salt-resistant polymer | Conventional polyacrylamide | Braided comb-shaped salt-resistant polymer |
|---|---|---|---|---|
| Solid content (wt %) | | 89.2 | 87.9 | 90.8 |
| Molecular weight/ten thousand | | 2514 | 1992.5 | 1792.95 |
| Degree of hydrolysis (%) | | 26.4 | 29.0 | 23.85 |
| Viscosity of aqueous solution (mPa · s) | Freshwater of Daqing | 66.5-70.6 | 64.4 | 88.7 |
| | Sewage of Daqing | 42.8-44.4 | 32.3 | 45.6 |
| | Sewage of Dagang | 34.2 | 25.8 | 36.5 |

Note:
The total mineralization degree of freshwater of Daqing Oil Field is 1,000 mg/L, of which $Ca^{2+} + Mg^{2+}$ is 15 mg/L; and that of sewage of Daqing Oil field is 4,000 mg/L, of which $Ca^{2+} + Mg^2$ is 60 mg/L; while that of sewage in Dagang Oil Field is 5,024 mg/L, of which $Ca^{2+} + Mg^{2+}$ is 25 mg/L.

What is claimed is:

1. A braided comb-shaped polymer thickening agent, copolymerized by monomer (A) and monomer (B), wherein the said monomer (A) is one or more water soluble unsaturated compound(s) with olefin chain, and the said monomer (B) is at least one compound with the following formula:

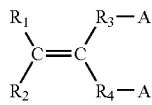

in which, in the formula of the said monomer (B), A is COOH, OH, or $SO_3H$; $R_1$ and $R_2$ are H or $C_1$-$C_{12}$ alkyl respectively; $R_3$ and $R_4$ represent $C_1$-$C_{12}$ alkyl, $C_1$-$C_{12}$ alkylaryl, $C_1$-$C_{12}$ alkyl ether or $C_1$-$C_{12}$ alkyl ester group respectively, and the said monomer (A) is present in an amount of 70~99.99% by mass of the total mass of monomer (A) and monomer (B).

2. The braided comb-shaped salt-resistant polymer thickening agent according to claim 1, characterized in that the said monomer (A) is selected from the group consisting of acrylamide, vinyl pyrrolidone, 2-acrylamide-2 methyl propane sulfonic acid, acrylic acid and the mixture thereof.

3. The braided comb-shaped salt-resistant polymer thickening agent according to claim 1, wherein the total monomer concentration of monomer (A) and monomer (B) in said polymerization system is about 10-50% by mass.

4. The braided comb-shaped salt-resistant polymer thickening agent according to claim 1, wherein the total monomer concentration of monomer (A) and monomer (B) in the said polymerization system is about 15-40% by mass.

5. The braided comb-shaped salt-resistant polymer thickening agent according to claim 1, wherein said monomer (B) is:

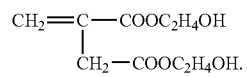

6. The braided comb-shaped salt-resistant polymer thickening agent according to claim 1, wherein said monomer (B) is:

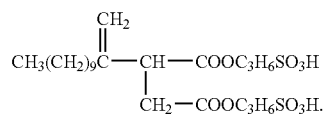

7. The braided comb-shaped salt-resistant polymer thickening agent according to claim 1, wherein said monomer (B) is:

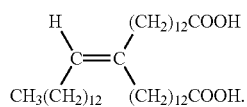

8. The braided comb-shaped salt-resistant polymer thickening agent according to claim 1, wherein said monomer (B) is:

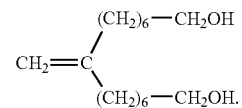

9. The braided comb-shaped salt-resistant polymer thickening agent according to claim 1, wherein said monomer (B) is:

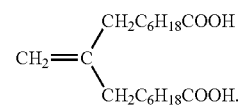

* * * * *